(12) United States Patent
Ross et al.

(10) Patent No.: US 11,978,978 B2
(45) Date of Patent: May 7, 2024

(54) PROCESS AND SYSTEM FOR MANAGING CARRIER SYSTEMS

(71) Applicant: CACI, Inc.—Federal, Arlington, VA (US)

(72) Inventors: Michael Ray Ross, Westminster, CO (US); Renato M. Camarda, Fanwood, NJ (US)

(73) Assignee: CACI, Inc.—Federal, Reston, VA (US)

(*) Notice: Subject to any disclaimer, the term of this patent is extended or adjusted under 35 U.S.C. 154(b) by 379 days.

(21) Appl. No.: 17/325,590

(22) Filed: May 20, 2021

(65) Prior Publication Data
US 2022/0201888 A1    Jun. 23, 2022

Related U.S. Application Data

(60) Provisional application No. 63/130,034, filed on Dec. 23, 2020.

(51) Int. Cl.
| | |
|---|---|
| G06N 20/00 | (2019.01) |
| G06F 9/4401 | (2018.01) |
| H01R 12/72 | (2011.01) |
| H01R 13/512 | (2006.01) |
| H01R 13/518 | (2006.01) |
| H05K 7/14 | (2006.01) |
| H05K 7/20 | (2006.01) |
| G06N 3/02 | (2006.01) |

(52) U.S. Cl.
CPC ......... *H01R 13/518* (2013.01); *G06F 9/4403* (2013.01); *H01R 12/727* (2013.01); *H01R 13/512* (2013.01); *H05K 7/1438* (2013.01); *H05K 7/20172* (2013.01); *G06F 9/4413* (2013.01); *G06N 3/02* (2013.01); *G06N 20/00* (2019.01); *H01R 2201/26* (2013.01)

(58) Field of Classification Search
CPC ... G06N 20/00; H05K 7/1438; H05K 7/20172
See application file for complete search history.

(56) References Cited

U.S. PATENT DOCUMENTS

| | | | |
|---|---|---|---|
| 7,352,573 B2 | 4/2008 | Wong | |
| 7,480,147 B2* | 1/2009 | Hoss | G06F 1/20 |
| | | | 361/721 |
| 9,326,401 B2 | 4/2016 | Duran et al. | |
| 10,143,093 B2 | 11/2018 | Kim et al. | |
| 10,238,004 B2 | 3/2019 | Baran et al. | |

(Continued)

OTHER PUBLICATIONS

AoC3U-410, 2021, LCR Embedded Systems, site visited Feb. 14, 2023: https://www.lcrembeddedsystems.com/aoc3u-410-chassis/#tab-5 (Year: 2021).

(Continued)

*Primary Examiner* — Phuong Chi Thi Nguyen
(74) *Attorney, Agent, or Firm* — BakerHostetler

(57) ABSTRACT

A system may include a plurality of rack-mountable, ruggedized drawers, each comprising a main body, a set of fans, a power supply, and a card connector. Connections may be provided, via a backplane of each of the card connectors, to a set of plugin cards each installed in the respective main body. A processor of the card connector of one of the drawers may represent the drawers by communicating information with an external third party.

20 Claims, 6 Drawing Sheets

(56) References Cited

U.S. PATENT DOCUMENTS

| | | | |
|---|---|---|---|
| 10,250,954 | B2 | 4/2019 | Christie et al. |
| 10,306,793 | B2 | 5/2019 | Coenegracht et al. |
| 10,361,546 | B2 | 7/2019 | Madathil et al. |
| 10,953,825 | B2 | 3/2021 | Sanvito et al. |
| 10,992,115 | B2 | 4/2021 | Yin |
| 11,503,741 | B2 | 11/2022 | Kandori et al. |
| 11,515,088 | B2 | 11/2022 | Kanayama et al. |
| 2017/0250493 | A1 | 8/2017 | Ijima et al. |

OTHER PUBLICATIONS

Silver Palm Tuner, unknown date, Curtiss-Wright, site visited Feb. 13, 2023: https://www.curtisswrightds.com/products/computing-systems/program-specific/electronic-warfare-system-sp (Year: 2023).

* cited by examiner

PROCESS AND SYSTEM FOR MANAGING CARRIER SYSTEMS

CROSS-REFERENCE TO RELATED APPLICATIONS

This application U.S. Provisional Application No. 63/130,034 filed on Dec. 23, 2020 and titled "Configurable IoT Apparatus and System for Communicating with Plugin Cards," the content of which is incorporated by reference herein in its entirety. This application further incorporates by reference herein the same-day-filed applications, titled "Configurable IoT Apparatus and System for Communicating with Plugin Cards," U.S. patent application Ser. No. 17/325,423 filed May 20, 2021, and "Systems, Apparatuses, and Methods for Predicting a State of a Card Connector," U.S. patent application Ser. No. 17/325,516 filed May 20, 2021.

TECHNICAL FIELD

The present disclosure generally relates to a controlling card connector that determines need for maintenance, a security alert, repair, or that addresses another state among plural card connectors.

BACKGROUND

Stationary racks typically have a front panel and printed circuit boards (PCBs) or cards connected to a backplane, e.g., SOSA, CERDEC, Open VPX (VITA 65), VPX (VITA 46), VXS, MicroTCA, VNX (VITA 74), cPCI, and VME. Such front panels are not known to be easily configurable, and they often operate without software and network connectivity. There is thus a need to expand capabilities of front panels from among similar devices or drawers.

SUMMARY

Systems and methods are disclosed for determining a representative state or another representation for a set of drawers or carrier systems. Accordingly, one or more aspects of the present disclosure relate to a method for providing a plurality of rack-mountable, ruggedized drawers, each comprising a main body, a set of fans, a power supply, and a card connector. Connections may be provided, via a backplane of each of the card connectors, to a set of plugin cards, each plugin card being installed in the respective main body. A processor of the card connector of one of the drawers may represent the drawers by communicating information with an external third party.

The method is implemented by a system comprising one or more hardware processors configured by machine-readable instructions and/or other components. The system comprises the one or more processors and other components or media, e.g., upon which machine-readable instructions may be executed. Implementations of any of the described techniques and architectures may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

DETAILED DESCRIPTION

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other.

Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

Figure 1:
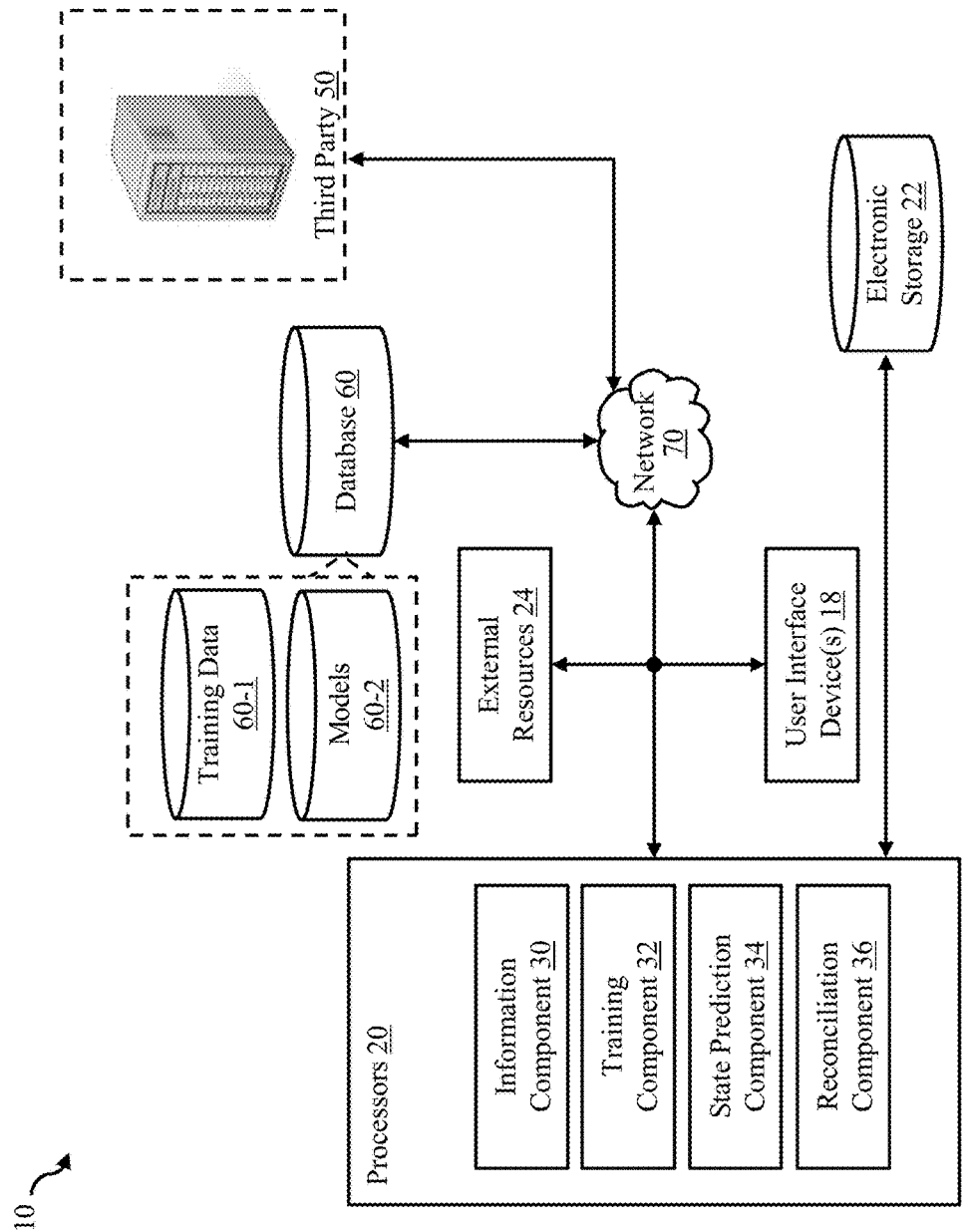
FIG. 1 illustrates an example of a system in which a state is determined, in accordance with one or more embodiments.

Presently disclosed are ways of determining a state or status of at least a set of PCBs of a card connector, which cooperates with and/or provides control to a set of plugin cards. FIG. 1 illustrates system 10 configured at least to predict this state or status. The herein-disclosed machine learning model may aid in predicting future events, such as for example a time, duration, location, and/or extent of state changes.

Artificial neural networks (ANNs) are models used in machine learning and may include statistical learning algorithms conceived from biological neural networks (particularly of the brain in the central nervous system of an animal) in machine learning and cognitive science. ANNs may refer generally to models that have artificial neurons (nodes) forming a network through synaptic interconnections (weights), and acquires problem-solving capability as the strengths of the interconnections are adjusted, e.g., at least throughout training. The terms 'artificial neural network' and 'neural network' may be used interchangeably herein.

An ANN may be configured to determine a classification (e.g., type of event) based on sensed information. An ANN is a network or circuit of artificial neurons or nodes. Such artificial networks may be used for predictive modeling.

The prediction models may be and/or include one or more neural networks (e.g., deep neural networks, artificial neural networks, or other neural networks), other machine learning models, or other prediction models. As an example, the neural networks referred to variously herein may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections may be enforcing or inhibitory, in their effect on the activation state of connected neural units. These neural network systems may be self-learning and trained, rather than explicitly programmed, and may perform significantly better in certain areas of problem solving, as compared to traditional computer programs. In some embodiments, neural networks may include multiple layers (e.g., where a signal path traverses from input layers to output layers). In some embodiments, back propagation techniques may be utilized to train the neural networks, where forward stimulation is used to reset weights on the front neural units. In some embodiments, stimulation and inhibition for neural networks may be more free-flowing, with connections interacting in a more chaotic and complex fashion.

Disclosed implementations of artificial neural networks may apply a weight and transform the input data by applying a function, this transformation being a neural layer. The function may be linear or, more preferably, a nonlinear activation function, such as a logistic sigmoid, Tanh, or rectified linear activation function (ReLU) function. Intermediate outputs of one layer may be used as the input into a next layer. The neural network through repeated transformations learns multiple layers that may be combined into a final layer that makes predictions. This learning (i.e., training) may be performed by varying weights or parameters to minimize the difference between the predictions and expected values. In some embodiments, information may be fed forward from one layer to the next. In these or other embodiments, the neural network may have memory or feedback loops that form, e.g., a neural network. Some embodiments may cause parameters to be adjusted, e.g., via back-propagation.

An ANN is characterized by features of its model, the features including an activation function, a loss or cost function, a learning algorithm, an optimization algorithm, and so forth. The structure of an ANN may be determined by a number of factors, including the number of hidden layers, the number of hidden nodes included in each hidden layer, input feature vectors, target feature vectors, and so forth. Hyperparameters may include various parameters which need to be initially set for learning, much like the initial values of model parameters. The model parameters may include various parameters sought to be determined through learning. And the hyperparameters are set before learning, and model parameters can be set through learning to specify the architecture of the ANN.

Learning rate and accuracy of an ANN rely not only on the structure and learning optimization algorithms of the ANN but also on the hyperparameters thereof. Therefore, in order to obtain a good learning model, it is important to choose a proper structure and learning algorithms for the ANN, but also to choose proper hyperparameters.

The hyperparameters may include initial values of weights and biases between nodes, mini-batch size, iteration number, learning rate, and so forth. Furthermore, the model parameters may include a weight between nodes, a bias between nodes, and so forth.

In general, the ANN is first trained by experimentally setting hyperparameters to various values, and based on the results of training, the hyperparameters can be set to optimal values that provide a stable learning rate and accuracy.

Some embodiments of models 60-2 may comprise a convolutional neural network (CNN). A CNN may comprise an input and an output layer, as well as multiple hidden layers. The hidden layers of a CNN typically comprise a series of convolutional layers that convolve with a multiplication or other dot product. The activation function is commonly a ReLU layer, and is subsequently followed by additional convolutions such as pooling layers, fully connected layers and normalization layers, referred to as hidden layers because their inputs and outputs are masked by the activation function and final convolution.

The CNN computes an output value by applying a specific function to the input values coming from the receptive field in the previous layer. The function that is applied to the input values is determined by a vector of weights and a bias (typically real numbers). Learning, in a neural network, progresses by making iterative adjustments to these biases and weights. The vector of weights and the bias are called filters and represent particular features of the input (e.g., a particular shape).

In some embodiments, the learning of models 60-2 may be of reinforcement, supervised, and/or unsupervised type. For example, there may be a model for certain predictions that are learned with one of these types but another model for other predictions may be learned with another of these types.

Reinforcement learning is a technique in the field of artificial intelligence where a learning agent interacts with an environment and receives observations characterizing a current state of the environment. Namely, a deep reinforcement learning network is trained in a deep learning process to improve its intelligence for effectively making predictions. The training of a deep learning network may be referred to as a deep learning method or process. The deep learning network may be a neural network, Q-learning network, dueling network, or any other applicable network.

Reinforcement learning may be based on a theory that given the condition under which a reinforcement learning agent can determine what action to choose at each time instance, the agent can find an optimal path to a solution solely based on experience of its interaction with the environment. For example, reinforcement learning may be performed mainly through a Markov decision process (MDP). MDP may comprise four stages: first, an agent is given a condition containing information required for performing a next action; second, how the agent behaves in the condition is defined; third, which actions the agent should choose to get rewards and which actions to choose to get penalties are defined; and fourth, the agent iterates until a future reward is maximized, thereby deriving an optimal policy.

Deep reinforcement learning (DRL) techniques capture the complexities of an environment in a model-free manner and learn about it from direct observation. DRL can be deployed in different ways such as for example via a centralized controller, hierarchal or in a fully distributed manner. There are many DRL algorithms and examples of their applications to various environments. In some embodiments, deep learning techniques may be used to solve complicated decision-making problems in wireless network optimization. For example, deep learning networks may be trained to adjust one or more parameters of a network with respect to an optimization goal.

Supervised learning is the machine learning task of learning a function that maps an input to an output based on example input-output pairs. It may infer a function from labeled training data comprising a set of training examples. In supervised learning, each example is a pair consisting of an input object (typically a vector) and a desired output value (the supervisory signal). A supervised learning algorithm analyzes the training data and produces an inferred function, which can be used for mapping new examples. And the algorithm may correctly determine the class labels for unseen instances.

Unsupervised learning is a type of machine learning that looks for previously undetected patterns in a dataset with no pre-existing labels. In contrast to supervised learning that usually makes use of human-labeled data, unsupervised learning does not via principal component (e.g., to preprocess and reduce the dimensionality of high-dimensional datasets while preserving the original structure and relationships inherent to the original dataset) and cluster analysis (e.g., which identifies commonalities in the data and reacts based on the presence or absence of such commonalities in each new piece of data). Semi-supervised learning is also contemplated, which makes use of supervised and unsupervised techniques.

Once trained, prediction model 60-2 of FIG. 1 may operate at a rate of 100 samples/minute, more than 1,000 samples per minute, or more than 10,000 samples per minute. Training component 32 of FIG. 1 may thus prepare one or more prediction models to generate predictions. Models 60-2 may analyze made predictions against a reference set of data called the validation set. In some use cases, the reference outputs may be provided as input to the prediction models, which the prediction model may utilize to determine whether its predictions are accurate, to determine the level of accuracy or completeness with respect to the validation set data, or to make other determinations. Such determinations may be utilized by the prediction models to improve the accuracy or completeness of their predictions. In another use case, accuracy or completeness indications with respect to the prediction models' predictions may be provided to the prediction model, which, in turn, may utilize the accuracy or completeness indications to improve the accuracy or completeness of its predictions with respect to input data. For example, a labeled training dataset may enable model improvement. That is, the training model may use a validation set of data to iterate over model parameters until the point where it arrives at a final set of parameters/weights to use in the model.

In some embodiments, training component 32 may implement an algorithm for building and training one or more deep neural networks. A used model may follow this algorithm and already be trained on data. In some embodiments, training component 32 may train a deep learning model on training data 60-1 providing even more accuracy, after successful tests with these or other algorithms are performed and after the model is provided a large enough dataset.

A model implementing a neural network may be trained using training data obtained by training component 32 from training data 60-1 storage/database. The training data may include many attributes of an environment. For example, this training data obtained from prediction database 60 of FIG. 1 may comprise hundreds, thousands, or even many millions of pieces of information (e.g., sensed data) describing the environment. The dataset may be split between training, validation, and test sets in any suitable fashion. For example, some embodiments may use about 60% or 80% of the information for training or validation, and the other about 40% or 20% may be used for validation or testing. In another example, training component 32 may randomly split the labelled information, the exact ratio of training versus test data varying throughout. When a satisfactory model is found, training component 32 may train it on 95% of the training data and validate it further on the remaining 5%.

The validation set may be a subset of the training data, which is kept hidden from the model to test accuracy of the model. The test set may be a dataset, which is new to the model to test accuracy of the model. The training dataset used to train prediction models 60-2 may leverage, via training component 32, an SQL server and a Pivotal Greenplum database for data storage and extraction purposes.

In some embodiments, training component 32 may be configured to obtain training data from any suitable source, via electronic storage 22, external resources 24 (e.g., which may include sensors), network 70, and/or UI device(s) 18. The training data may comprise captured images, smells, light/colors, shape sizes, noises, other sounds, and/or other discrete instances of sensed and/or measured information.

In some embodiments, training component 32 may enable one or more prediction models to be trained. The training of the neural networks may be performed via several iterations. For each training iteration, a classification prediction (e.g., output of a layer) of the neural network(s) may be determined and compared to the corresponding, known classification. For example, sensed data known to capture a closed environment comprising dynamic and/or static objects may be input, during the training or validation, into the neural network to determine whether the prediction model may properly predict a path for the user to reach or avoid said objects. As such, the neural network is configured to receive at least a portion of the training data as an input feature space. Once trained, the model(s) may be stored in database/storage 60-2 of prediction database 60, as shown in FIG. 1, and then used to classify samples of sensed information based on observable attributes.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface device 18, processor 20, etc.). In some embodiments, electronic storage 22 may be located in a server together with processor 20, in a server that is part of external resources 24, in user interface devices 18, and/or in other locations. Electronic storage 22 may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 22 may store software algorithms, information obtained and/or determined by processor 20, information received via user interface devices 18 and/or other external computing systems, information received from external resources 24, and/or other information that enables system 10 to function as described herein.

External resources 24 may include sources of information (e.g., databases, websites, etc.), external entities participating with system 10, one or more servers outside of system 10, a network, electronic storage, equipment related to Wi-Fi technology, equipment related to Bluetooth® technology, data entry devices, a power supply (e.g., battery powered or line-power connected, such as directly to 90-264 volts AC or indirectly via AC/DC conversion), a transmit/receive element (e.g., an antenna configured to transmit and/or receive wireless signals), a network interface controller (NIC), a display controller, a graphics processing unit (GPU), and/or other resources. In some implementations, some or all of the functionality attributed herein to external resources 24 may be provided by other components or resources included in system 10. Processor 20, external resources 24, user interface device 18, electronic storage 22, a network, and/or other components of system 10 may be configured to communicate with each other via wired and/or wireless connections, such as network 70.

User interface device(s) 18 of system 10 may be configured to provide an interface between one or more users and system 10. User interface devices 18 are configured to provide information to and/or receive information from the one or more users. User interface devices 18 include a user interface and/or other components. The user interface may be and/or include a graphical user interface configured to present views and/or fields configured to receive entry and/or selection with respect to particular functionality of system 10, and/or provide and/or receive other information. In some embodiments, the user interface of user interface devices 18 may include a plurality of separate interfaces associated with processors 20 and/or other components of system 10. Examples of interface devices suitable for inclusion in user interface device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that user interface devices 18 include a removable storage interface. In this example, information may be loaded into user interface devices 18 from removable storage (e.g., a smart card, a flash drive, a removable disk) that enables users to customize the implementation of user interface devices 18.

In some embodiments, user interface devices 18 are configured to provide a user interface, processing capabilities, databases, and/or electronic storage to system 10. As such, user interface devices 18 may include processors 20, electronic storage 22, external resources 24, and/or other components of system 10. In some embodiments, user interface devices 18 are connected to a network (e.g., the Internet). In some embodiments, user interface devices 18 do not include processor 20, electronic storage 22, external resources 24, and/or other components of system 10, but instead communicate with these components via dedicated lines, a bus, a switch, network, or other communication means. The communication may be wireless or wired. In some embodiments, user interface devices 18 are laptops, desktop computers, smartphones, tablet computers, and/or other user interface devices.

Data and content may be exchanged between the various components of the system 10 through a communication interface and communication paths using any one of a number of communications protocols. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol version 4 (IPv4) and Internet Protocol version 6 (IPv6).

In some embodiments, processor(s) 20 may form part (e.g., in a same or separate housing) of a user device, a consumer electronics device, a mobile phone, a smartphone, a personal data assistant, a digital tablet/pad computer, a wearable device (e.g., watch), augmented reality (AR) goggles, virtual reality (VR) goggles, a reflective display, a personal computer, a laptop computer, a notebook computer, a work station, a server, a high performance computer (HPC), a vehicle (e.g., embedded computer, such as in a dashboard or in front of a seated occupant of a car or plane), a game or entertainment system, a set-top-box, a monitor, a television (TV), a panel, a space craft, or any other device. In some embodiments, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, user interface devices 18, devices that are part of external resources 24, electronic storage 22, and/or other devices).

As shown in FIG. 1, processor 20 is configured via machine-readable instructions to execute one or more computer program components. The computer program components may comprise one or more of information component 30, training component 32, state prediction component 34, reconciliation component 36, and/or other components. Processor 20 may be configured to execute components 30, 32, 34, and/or 36, by: software; hardware; firmware; some combination of software, hardware, and/or firmware; and/or other mechanisms for configuring processing capabilities on processor 20.

It should be appreciated that although components 30, 32, 34, and 36 are illustrated in FIG. 1 as being co-located within a single processing unit, in embodiments in which processor 20 comprises multiple processing units, one or more of components 30, 32, 34, and/or 36 may be located remotely from the other components. For example, in some embodiments, each of processor components 30, 32, 34, and 36 may comprise a separate and distinct set of processors. The description of the functionality provided by the different components 30, 32, 34, and/or 36 described below is for illustrative purposes, and is not intended to be limiting, as any of components 30, 32, 34, and/or 36 may provide more or less functionality than is described. For example, one or more of components 30, 32, 34, and/or 36 may be eliminated, and some or all of its functionality may be provided by other components 30, 32, 34, and/or 36. As another example, processor 20 may be configured to execute one or more additional components that may perform some or all of the functionality attributed below to one of components 30, 32, 34, and/or 36.

In some embodiments, training component 30 is configured to information from third party 50, electronic storage 22, external resources 24, and/or via user interface device(s) 18. In some embodiments, training component 30 is connected to network 70. The connection to network 70 may be wireless or wired.

In some embodiments, system 10 may include one or more carrier systems 200. Card connector 204 of each of the carrier system(s) 200 may be removably coupled (e.g., via fasteners 206) to a respective main body 202. For example, one or more handles 252, 278 may be used for mounting or dismounting card connector 204 onto main body 202, and/or the handles 252, 278 may be used for mounting or dismounting carrier system 200 into a frame. In this or another example, one or more handles 252, 278 may be used to transport carrier system 200 or card connector 204, when the latter is decoupled from main body 202.

In some embodiments, card connector 204 is an Internet of things (IoT) device. In some embodiments, card connector 204 may communicate with a set of plugin cards 226.

Figure 2:
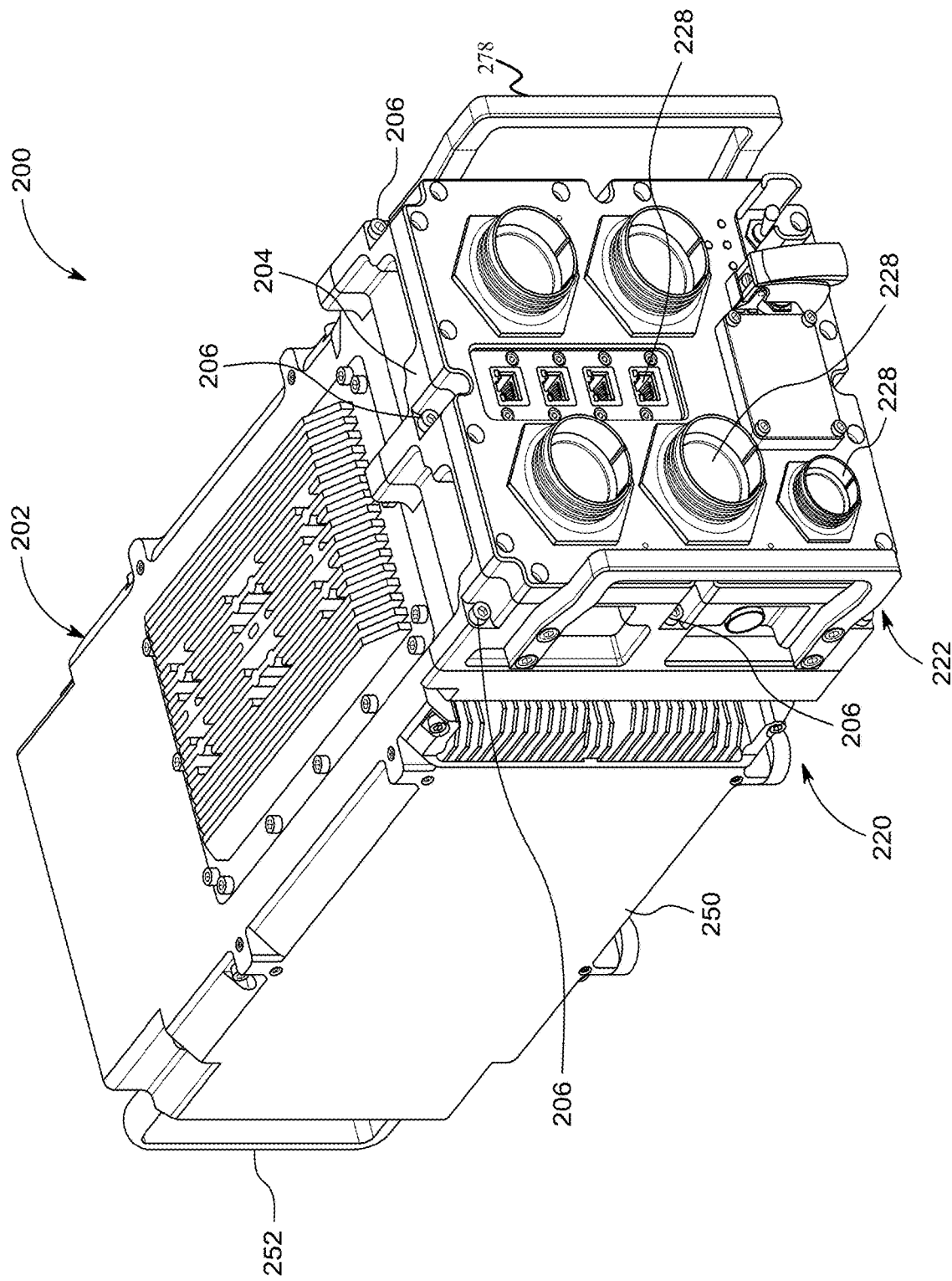
FIG. 2 illustrates an isometric view of an example carrier system, in accordance with one or more embodiments.
Figure 3:
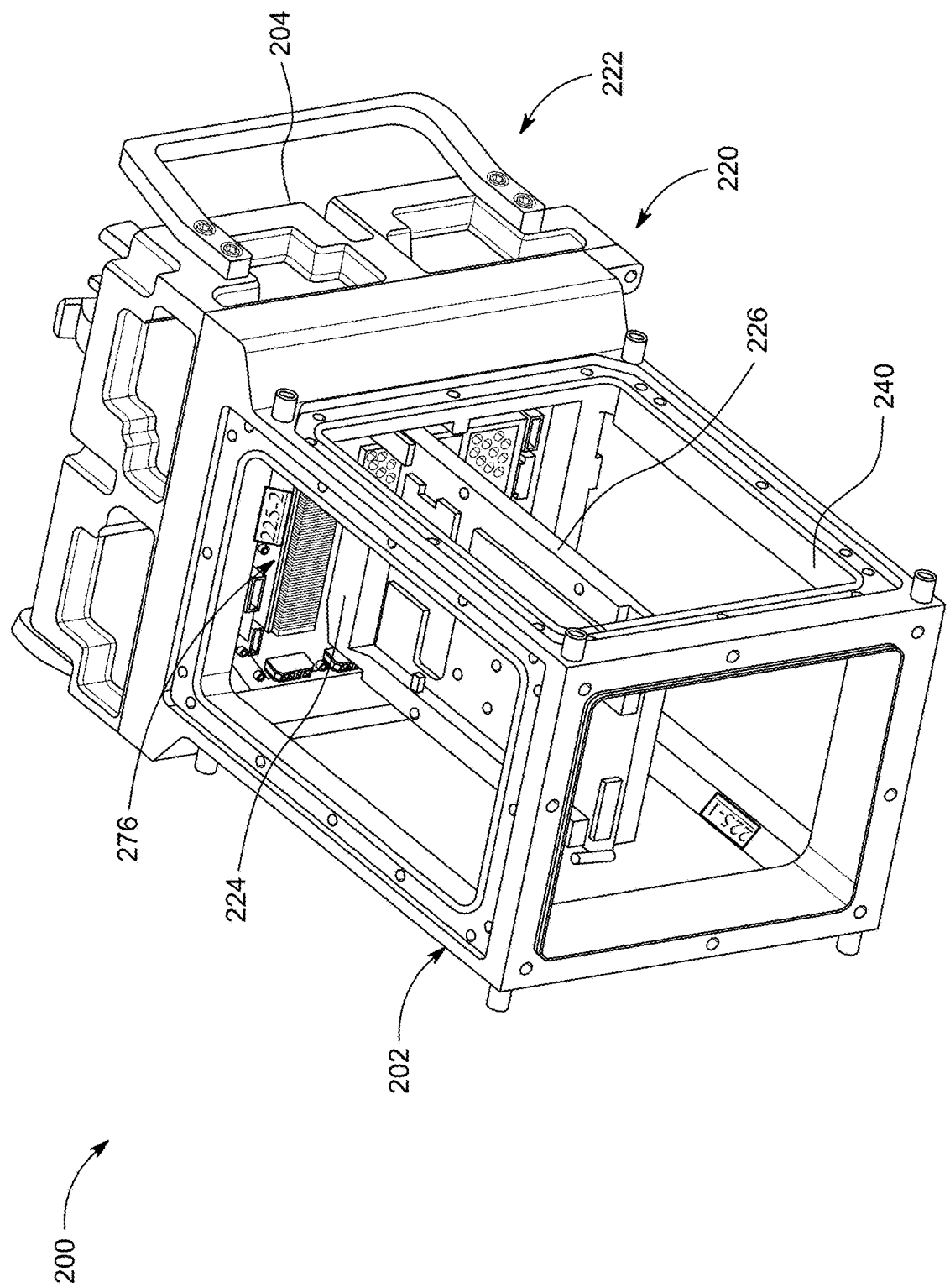
FIG. 3 illustrates an isometric view of an interior of the example carrier system, in accordance with one or more embodiments.
Figure 4:
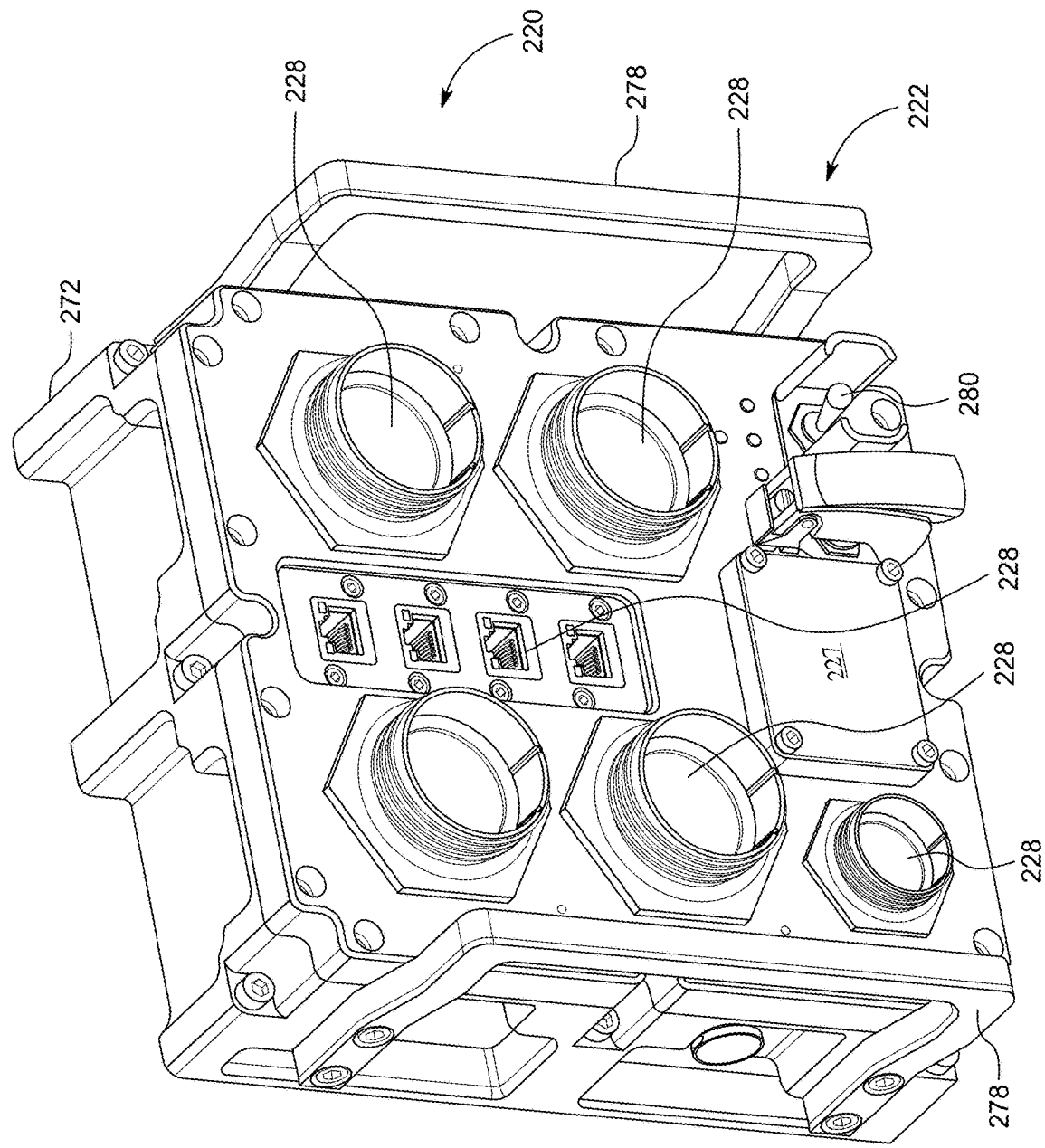
FIG. 4 illustrates a front view of a card connector of the example carrier system, in accordance with one or more embodiments.

In some embodiments, main body 202 may be integrated into a stationary (e.g., rack) frame or a mobile (e.g., vehicular) frame. An outer frame enclosing carrier system 200 may comprise other components, such as other carrier systems, other drawers, and/or other hardware, including fans, a battery, LEDs, passive components, a fuse, and a power supply. Each carrier system 200 may comprise main body 202, card connector 204, and shell 250 that covers frame 240, as shown in the ruggedized example of FIGS. 2-3. Frame 240 may be configured to support a protrusion, when the protrusion extends through opening 276 such that the opening receives first PCB 220. Card connector 204 may include outer flange 272 and the protrusion, which may extend from outer flange 272, as depicted in the ruggedized example of FIG. 4.

In some embodiments, card connector 204 may include a set of PCBs, e.g., first PCB 220, a second PCB (not shown), and third PCB 222. In some embodiments, first PCB 220, second PCB, and third PCB 222 may be the same PCB; in other embodiments, first PCB 220, the second PCB, and third PCB 222 may each comprise a distinct and separate PCB. Each of the PCBs may include a plurality of layers and components mounted on its surface. For example, first PCB 220 may include backplane 224 and sensors 225, the second PCB may include processor 20 and memory 22, and third PCB 222 may include connectors 228 and switch 280.

In some embodiments, backplane 224 comprises one or more connectors to facilitate signals therethrough via a bus or another communications network. For example, backplane 224 may comprise gigabit Ethernet, PCIe, optical, Serial RapidIO, or another communications protocol.

In some embodiments, one or more input signals are obtained via an interface element (e.g., switch, knob, button, connector, port, etc.) of the front panel. In these or other embodiments, the input signal(s) may be inputted with respect to a wireless transceiver that wirelessly obtains a data signal from a source external to the main body (e.g., third party 50 or another node connected via network 70). In some embodiments, the input signal is from third party 50 that indicates a recommendation for repairing, performing maintenance on, securing, and/or upgrading at least a portion of carrier system 200 (e.g., card connector 204).

In another example, card connector 204 may comprise hardware for obtaining a wireless, Internet connection. In this or another example, the Internet connection may be obtained, e.g., via a local area network (LAN), a wide area network (WAN), a radio access network (RAN), a public switched telephone network (PSTN), cellular (e.g., GSM, UMTS, LTE, 5G, etc.), satellite, Wi-Fi technology, another wireless communications link (e.g., radio frequency (RF), microwave, infrared (IR), ultraviolet (UV), visible light, cm wave, mm wave, etc.), a base station, and/or other resources. In some embodiments, the input signal(s) may be from a setting on a front panel interface element and/or from a signal driven by plugin card 226; an input signal may be obtained wirelessly, in these or other embodiments.

In some embodiments, processor 20 may be coupled to a global positioning system (GPS) chipset, which may be configured to provide location information (e.g., longitude, latitude, and/or height) regarding a current location of card connector 204. For example, card connector 204 may acquire location information by way of any suitable location-determination method while remaining consistent with an embodiment. This location may be used, e.g., to determine occurrence of an anomaly, such as when outside a safe, expected, or controlled area. GPS can also be used for precise timing.

In some embodiments, card connector 204 may have pull-up or pull-down resistors such that input signals are pulled logic high or logic low, respectively, based on a safe, initial condition when no external device is connected thereof. An anomaly may be detected upon such device being connected, when the signal logic level changes from an expected or safe level. This device may be a device connected via backplane 224 or via a front panel (e.g., which may include third PCB 222 and connectors 228).

In some embodiments, an input signal is externally determined via a third party that uses an output signal internally determined with respect to one or more electrical components mounted on third PCB 222. For example, the input signal may be obtained from third party 50 responding to a request for this server to make a state determination for card connector 204. In some embodiments, this request may be outputted from card connector 204 with one or more internal data values internally generated via an electrical component mounted on third PCB 222. For example, the internal data value may relate to a battery level, a local configuration, performance information, and/or status information.

In some embodiments, the state may comprise at least one combination of states, such as operational, less than operational, less than operational and tampered, less than operational and needing maintenance, needing maintenance and needing repair, tampered and not working, need for firmware update, or another suitable combination. For example, when card connector 204 or a component thereon is less than operational, it may substantially work well and satisfy at least a majority of performance criteria; but the device may require further investigation (e.g., of a fault or warning). In this or another example, third party 50 may provide information or a component internal to card connector 204 may determine information that attempts addressing a related bug, anomaly, and/or other suboptimal performance issue.

In some embodiments, information may be outputted to third party 50. For example, this information may comprise one or more of a present state, performance information, anomaly information, maintenance information, repair information, tamper or security information, or other information (e.g., internally determined at card connector 204 and/or obtained from plugin card 226).

In some embodiments, a determination that the state of card connector 204 requires repair may be made locally or externally by third party 50. The data used to determine the state may be generated and used in real-time, or said data may be generated and used in batches. The beneficial use and subsequent control may be at card connector 204. The state may be determined using data from sensors 225.

In some embodiments, one or more sensors may be operably mounted on a wall or other portion of main body 202 (e.g., sensor 225-1); in these or other embodiments, one or more sensors may be operably mounted on one or more of the PCBs of card connector 204 (e.g., sensor 225-2). In these or other embodiments, a set of sensors may be further mounted on plugin card 226, which may be communicably coupled to card connector 204. For example, each of these sensors may be one of a light sensor, accelerometer, magnetometer, rotation sensor, haptic sensor, odor sensor, chemical sensor, radiation sensor, light sensor, proximity sensor, optical camera sensor, temperature sensor, pressure sensor, humidity sensor, audio sensor, microphone, inertial measurement unit (IMU), and gyroscope. In some embodiments, a plurality of sensors may be used in combination. The combination of data obtained from the plurality of sensor types may provide improved means for filtering false positives and may assist in more accurately determining an actual tamper event or another state.

In some embodiments, card connector 204 may detect tamper via an observed change in an environment. For example, tamper events may be detected by monitoring conditions using a sensor, and depending on the type of sensor employed, a unique identifier may be returned to indicate that a change in condition has occurred.

In some embodiments, raw data output from one or more sensors 225 may go through a transformation process. In some implementations, several kinds of preprocessing steps involving data transformation may improve the accuracy of predictions (e.g., made via machine learning). Exemplary transformations include operations that can be implemented on a processor in real-time, to substantially change the mathematical basis of the data in ways that expose properties that might be useful for making better predictions.

Telemetry, including in-situ collected measurements or other data at or near card connector 204, may be automatically emitted to third party 50, for monitoring. For example, real-time telemetry data may include repair, maintenance, and tamper information. In this or another example, real-time telemetry data may include other internal system functionalities/capabilities, such as altitude, temperature, communication events (data flow, attacks, etc.). As such, card connector 204's input/output (I/O) interfaces may enable a real, smart, and secure device to operate, rather than implement only a faceplate or backplane. In some embodiments, the internal data value (e.g., which may affect the state) may relate to a determined flow of communication signals through card connector 204.

In some embodiments, telemetry from plugin card 226 and/or card connector 204 may be used to determine modifications (e.g., to be implemented when creating a replacement card connector that replaces an existing card connector).

In some embodiments, card connector 204 may generate information for locally determining a state or for remotely determining the state using the information. For example, the state may indicate need for repair, addressing tamper, maintenance, a reset, or other action. In some embodiments, models 60-2 may be used to predict, for card connector 204, a state (e.g., maintenance, tamper, or another current status).

In some embodiments, card connector 204 may be separable from main body 202. Upon separating, one or more components and/or one or more interfaces/connections of card connector 204 may be modified, reconfigured, upgraded, or replaced.

In some embodiments, information component 30 may receive data associated with one or more electrical components of card connector 204 or one or more components of main body 202. In some embodiments, state prediction component 34 may determine the data meets one or more predetermined thresholds, e.g., indicating repair or other activity is required. In some embodiments, reconciliation component 36 may store and/or externally emit the data over network 70 (e.g., to third party 50), to initiate a repair request. In these embodiments, component 36 may then receive a communication over network 70 (e.g., from third party 50), regarding a recommendation for repairing card connector 204.

In some embodiments, sensor(s) 225 or a microcontroller of card connector 204 may sense an event has occurred, attributed to tamper (i) at or within main body 202 and/or (ii) of a component of card connector 204. In some embodiments, state prediction component 34 may determine whether the sensed event meets one or more predetermined thresholds, e.g., to confirm the tamper based on the determination. In some embodiments, reconciliation component 36 may store and/or emit a signal to one or more affected components in card connector 204 or to a portion of main body 202, e.g., to disable functionality related to or affected by the tamper. In these embodiments, component 36 may then transmit a record of the event to third party 50 over network 70. For example, responsive to the state being determined as the tampered state, reconciliation component 36 may disable or otherwise secure at least the portion of the system. In some embodiments, information component 30 may monitor and log/record all events as they occur. For example, an interface (e.g., at backplane 224 or the front panel) may be provided to relay the logged events for external data analytics processing. In another example, the logged events may be internally processed (e.g., by state prediction component 34).

In some embodiments, the state may be determined as tampered based on (i) an anomaly detected within main body 202, (ii) an anomaly determined at an electrical component of card connector 204, (iii) an anomaly of an external device connected to card connector 204 via at least one of front panel and backplane connectors, and/or (iv) an anomaly of plugin card 226 connected to card connector 204 via backplane 224.

In some embodiments, sensor(s) 225 or a microcontroller of card connector 204 may output data, indicating one or more changes of light, acceleration, magnetic field, rotation, temperature, pressure, humidity, audio, and flow of networking communication signals thereabout. In some embodiments, information component 30 may obtain and store this data, for local or remote evaluation. For example, state prediction component 34 may determine whether the data falls outside one or more configurable thresholds, a score being associated with each of the one or more configurable thresholds. Component 34 may then determine the state of card connector 204 based on the determination.

In some embodiments, information component 30 may obtain and then locally store (i) time and date information of the state determination and (ii) data used to determine said state. In these or other embodiments, raw sensor information or locally determined information may be output to third party 50, for further action, or the information may be consumed locally, for implementing the further action.

For example, data received from a 3-axis accelerometer may signify a change in acceleration, which may be indicative that carrier system 200 may be moving or has been moved. Data received from the 3-axis magnetometer may instead or additionally signify a change in orientation, or a change in the magnetic field around the module, further indicating movement from a previous position and location.

For example, in one embodiment, the evaluation of light may be whether it is greater than 10 lux. In another embodiment, the evaluation of a magnitude of acceleration, with anomaly pre-processing, is whether it is greater than 0.1 g. In yet another embodiment, the evaluation of a magnitude of magnetic field, with derivative and anomaly pre-processing, is whether its magnitude is changing at a rate greater than 4 µT/s. In yet even another embodiment, the evaluation of magnitude of rotation of the gyroscope, with anomaly pre-processing, is whether it is changing at a rate greater than 10 degrees. In yet even a further embodiment, the evaluation of audio is 32+dB(FFT(Audio)*A-weight factor. The audio is preprocessed with FFT.

The processor 20 may also perform security operations, such as authentication, security key agreement, and/or cryptographic operations.

In some embodiments, upon a change to or from a particular state, an alert may be generated by reconciliation component 36 and issued to a relevant user (e.g., via user interface devices 18) of carrier system 200. Then, a predetermined procedure may be initiated, e.g., to disable one or more components of card connector 204 and/or initiate a wipe procedure to delete information that may be stored thereon (e.g., in the event of tamper).

In some embodiments, card connector 204 may take part, via backplane 224, in testing functionality of plugin cards 226. For example, the plugin cards may be hot-swappable into/from a backplane slot to expedite testing.

In some embodiments, carrier system 200 may enter a reduced-functionality mode or a safe mode, until a situation involving at least one of maintenance, repair, and tamper is resolved. For example, reconciliation component 36 may precisely determine an amount of time remaining on a set of batteries 227 (e.g., 1 or 2 days, weeks, or months), e.g., before a replacement or service is needed, avoiding downtime and/or system wiping. In some embodiments, the reduced-functionality mode may be a low-power mode or another suitable way of operating.

In some embodiments, information component 30 may initially aggregate all raw data from sensors 225, and training component 32 may initially train on related metadata provided as inputs to model 60-2. When under power consumption constraints in deployment, model 60-2 may predict using data collected at a lower time-sampling rate (e.g., lower power modes that have higher noise floors). In these or other implementations, information component 30 and/or training component 32 may take collected, high-quality data and directly use it or pre-reduce their quality, for training model 60-2. In one of those or another embodiment, sensors 225 may collect data at low rates (and/or with a lower quality) to reduce power consumption. However, once a state change is detected, one or more of these sensors may be enabled to sample at a higher rate (and/or with a higher quality) for logging data attributed to this event.

Figure 6:
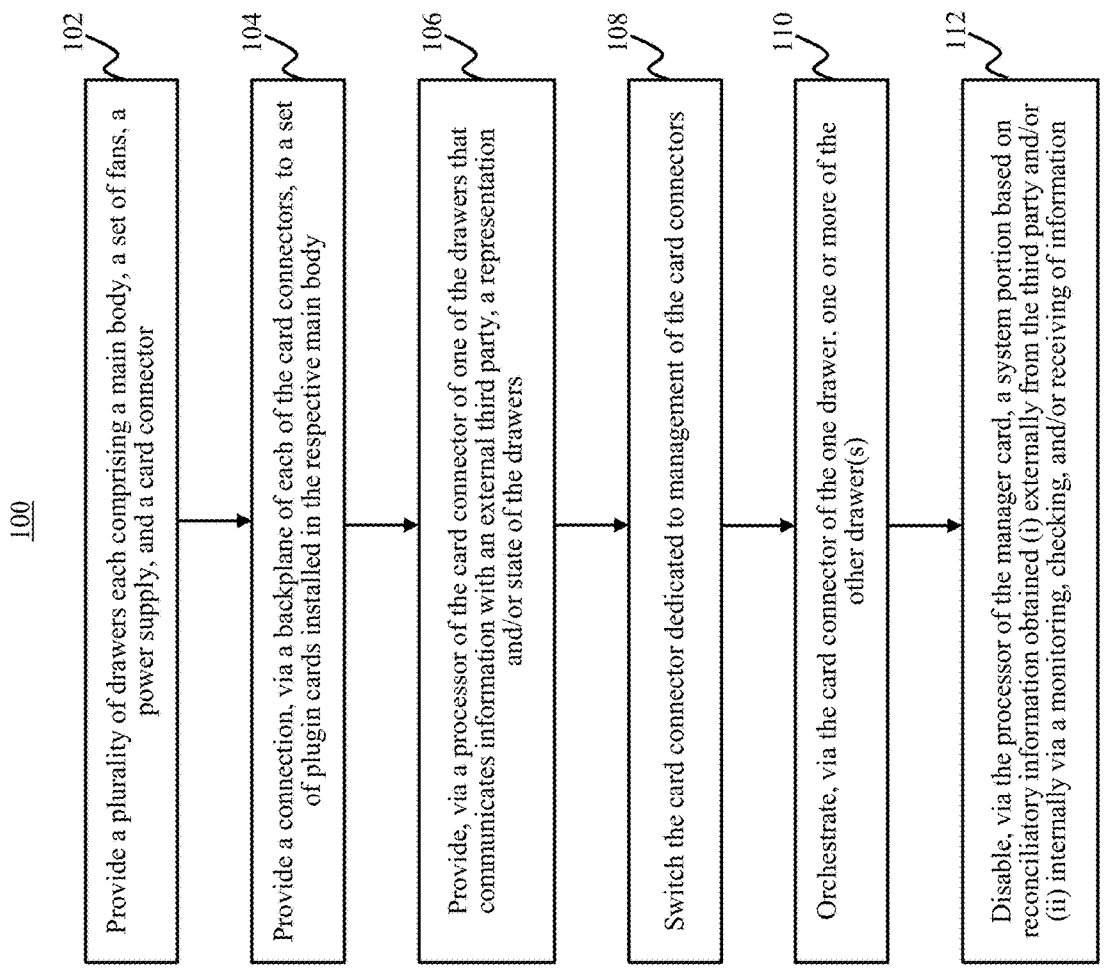
FIG. 6 illustrates a process for determining a representation, state, manager, orchestration, and disabled system portion, in accordance with one or more embodiments.

FIG. 6 illustrates method 100 for managing a plurality of carrier systems interchangeably via a card connector therein, in accordance with one or more embodiments. Method 100 may be performed with a computer system comprising one or more computer processors and/or other components. The processors are configured by machine readable instructions to execute computer program components. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 6 and described below is not intended to be limiting. In some embodiments, method 100 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of method 100 in response to instructions stored electronically on an electronic storage medium. The processing devices may include one or more devices configured through hardware, firmware, and/or software to be specifically designed for execution of one or more of the operations of method 100.

Figure 5:
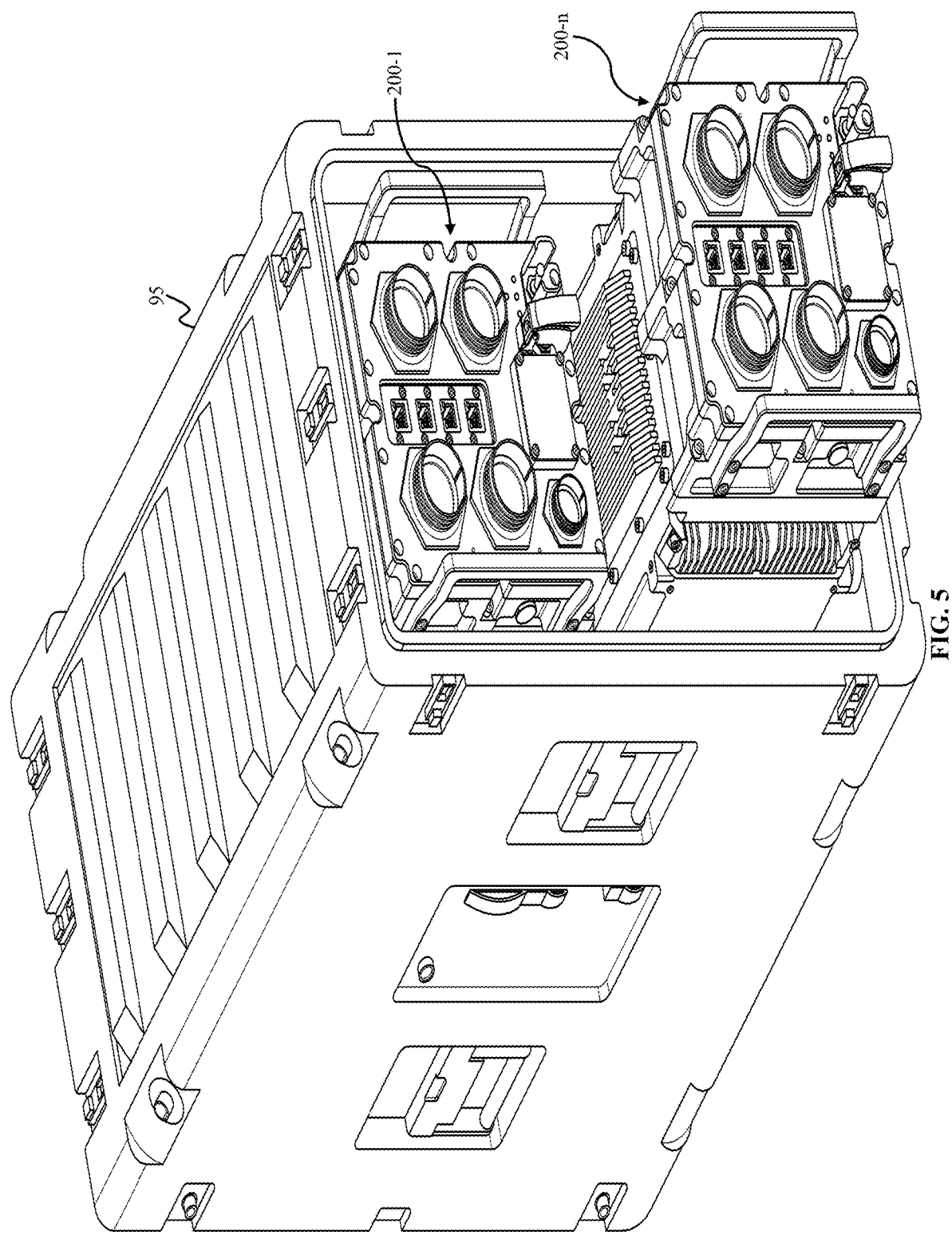
FIG. 5 illustrates an isometric view of plural carrier systems slidably installed in a rack, in accordance with one or more embodiments.

At operation 102 of method 100, a plurality of drawers each comprising a main body, a set of fans, a power supply, and a card connector may be provided. Each of the drawers may comprise carrier system 200, which may in turn comprise main body 202 and card connector 204. In some embodiments, card connector 204 may include (i) a first PCB having backplane 224, (ii) a third PCB having a plurality of ruggedized connectors 228 each configured to couple to an external system (e.g., server 50 or another device), and (iii) a second PCB interposed between the first and third PCBs. As an example, each of a plurality of carrier systems 200 (e.g., 200-1 . . . 200-n, n being any natural number greater than 1) may be slidably installed into ruggedized rack 95, as shown in the example of FIG. 5. In this or another example, each carrier system 200 may be installed or integrated into a vehicular, mobile frame. In some embodiments, operation 102 is performed by a hardware technician.

At operation 104 of method 100, a connection may be provided, via a backplane of each of the card connectors, to a set of plugin cards installed in the respective main body. As an example, backplane 224 may be configured to electrically couple to a set of plugin cards 226, each of the plugin card(s) being removably installed within main body 202. In some embodiments, operation 104 is performed by the hardware technician and facilitated thereafter via a processor component the same as or similar to information component 30 (shown in FIG. 1 and described herein).

At operation 106 of method 100, a representation and/or state of the drawers may be outputted, via a processor of the card connector of one of the drawers; the processor may communicate this or other information with an external third party. As an example, state prediction component 34 may determine this representation that may describe an overall state of card connectors 204, and reconciliation component 36 may provide this information or related information to third party 50. In this or another example, only a card connector of one drawer may be needed to interface with an external device or system. The one drawer may determine the state from among or between all of drawers (i) integrated together in a same frame or (ii) set in a distinct group (e.g., of a same region or configuration). For example, the overall state may be determined by resolving differences of states between the drawers, such as by (i) prioritizing a critical alert of one drawer over a less important status of another drawer or (ii) averaging numerical values that each map to a predetermined state. In some embodiments, the overall state may be determined, at the card connector of the one drawer, by initially determining a state at the card connectors of one or more of the other drawer(s). In these or other embodiments, initially determined states of each individual card connector may be based on a monitoring, a checking, and/or a receiving of relevant information.

At operation 108 of method 100, the card connector dedicated to management of the card connectors may be switched. As an example, card connector 204 of carrier system 200-1 may initially operate as manager of all other card connectors 204, of all card connectors 204 of a region, or of all card connector(s) 204 of other carrier system(s) 200-$n$ installed in a same rack 95. In this example, this management load may be balanced among all of these card connectors 204. That is, card connectors 204 may alternate this role, or they may otherwise swap out that role from a current card connector acting in that role. In some embodiments, operation 108 is performed by a processor component the same as or similar to reconciliation component 36 (shown in FIG. 1 and described herein).

At operation 110 of method 100, one or more of the other drawer(s) may be orchestrated, via the card connector of the one drawer. As an example, the orchestration may comprise facilitating at least one of a boot-up sequence (e.g., where the card connector of carrier system 200-1 commands itself to reset before the card connector of carrier system 200-$n$ resets), a power consumption priority (e.g., where the card connector of carrier system 200-1 allows another card connector to consume more power), and a security priority (e.g., where the card connector of carrier system 200-1 has higher priority than other card connectors and thus is disabled or taken offline for maintenance first). In this or another example, the card connector of the one drawer may cause a built-in self-testing of functionality provided at the card connectors themselves and/or at the set of plugin cards respectively coupled thereto. The orchestration may thus comprise a controlling operation. Each card connector 204 may be operable standalone or in coordination with other card connectors 204. In some embodiments, operation 110 is performed by a processor component the same as or similar to reconciliation component 36 (shown in FIG. 1 and described herein).

At operation 112 of method 100, a portion of the system may be disabled, via the processor of the manager card connector based on reconciliatory information obtained (i) externally from the third party and/or (ii) internally via a monitoring, checking, and/or receiving of information. As an example, one or more components of a PCB of manager card connector 204, one or more components of plugin card 226, and/or one or more other components within or external to carrier system 200 may be controlled into a safe or disabled state. In this or another example, the disabling may be triggered by data flow surpassing a threshold or by falling below another threshold. The disabling may instead or additionally be triggered by a data value being checked against expected value(s) and found to be anomalous. In this or another implementation, the disabling may be based on reconciliatory information obtained from third party 50, which may provide a repair solution or a command to perform the disabling of one or more portions of system 10. In some embodiments, operation 112 is performed by a processor component the same as or similar to reconciliation component 36 (shown in FIG. 1 and described herein).

Techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Several embodiments of the disclosure are specifically illustrated and/or described herein. However, it will be appreciated that modifications and variations are contemplated and within the purview of the appended claims.

What is claimed is:

1. A carrier system, comprising:
   a plurality of drawers each comprising a main body, a set of fans, a power supply, and a card connector;
   a backplane of the card connector configured to electrically couple to a set of plugin cards, wherein the set of plugin cards is removably installed in the respective main body; and
   a processor of the card connector of one of the drawers configured to represents the drawers by communicating information with an external third party.

2. The system of claim 1, wherein the processor of the card connector performs the representation by prioritizing information outputted from the card connectors of different drawers.

3. The system of claim 1, wherein the card connector of the one drawer is configured to control functionality for the set of plugin cards.

4. The system of claim 1, wherein the card connector of the one drawer is removably coupled to the respective main body.

5. The system of claim 1, wherein the card connector of the one drawer orchestrates one or more of the other drawer(s).

6. The system of claim 5, wherein the orchestration comprises facilitating at least one of a boot-up sequence, a power consumption priority, and a security priority.

7. The system of claim 1, wherein the processor of the card connector determines information internal to the system via at least one of a monitoring, checking, and receiving of information.

8. The system of claim 7, wherein the processor of the card connector obtains reconciliatory information from the third party, and
wherein the processor of the card connector disables one or more portions of the system based on the reconciliatory information.

9. The system of claim 1, wherein one of the drawers is configured to determines a state for the plurality of other drawers, wherein the state may include a safe sate or a disabled state.

10. The system of claim 9, wherein the state is determined, at the card connector of the one drawer, by initially determining a state at the card connectors of one or more of the other drawer(s).

11. The system of claim 9, wherein the state of one drawer is determined by evaluating states of one or more other drawers.

12. A method for load balancing, the method comprising:
providing a plurality of drawers;
integrating each of the drawers into a rack, wherein each of the drawers comprises a card connector and a main body, wherein the card connector includes a processor; and
switching the card connector dedicated to management of the card connectors.

13. The method of claim 12, wherein each of the main bodies houses a set of plugin cards.

14. The method of claim 13, wherein each of the card connectors includes (i) a first printed circuit board (PCB) having the respective backplane configured to electrically couple to the respective set of plugin cards, (ii) a third PCB having a plurality of ruggedized connectors configured to couple to an external system, and (iii) a second PCB interposed between the first and third PCBs.

15. The method of claim 14, wherein the processor (i) is mounted on the second PCB of the dedicated manager and (ii) determines a state of at least a portion of the drawers based on a sensor output, an input signal and/or an output signal with respect to the respective drawer, and a data value internally determined in the respective drawer.

16. The method of claim 15, wherein the state comprises at least one of operational, less than operational, tampered, needing maintenance, needing repair, and not working, and
wherein the determination is performed via one or more criteria being satisfied.

17. The method of claim 15, wherein the input signal is inputted with respect to a transceiver that obtains a data signal from an external third party.

18. The method of claim 15, wherein the sensor output is from one or more of a light sensor, acceleration sensor, magnetic field sensor, rotation sensor, temperature sensor, pressure sensor, humidity sensor, and audio sensor.

19. A carrier system, comprising:
a drawer that orchestrates one or more other drawers;
a card connector for each of the drawers, wherein the card connector comprises a processor; and
a backplane of the card connector configured to electrically couple to a set of plugin cards in the drawer,
wherein the processor is configured to predict an orchestration among the drawers via a trained machine learning model.

20. The system of claim 19, wherein the processor performs the orchestration by controlling an operation of the drawers,
wherein the orchestration is performed based on an output of (i) one or more sensors operably mounted on a wall of a main body coupled to the drawer within the same structure and (ii) one or more sensors operably mounted within the drawer.

* * * * *